No. 706,441. Patented Aug. 5, 1902.
J. K. McLAUGHLIN.
PULP SEPARATOR.
(Application filed Oct. 4, 1901.)
(No Model.) 2 Sheets—Sheet 1.
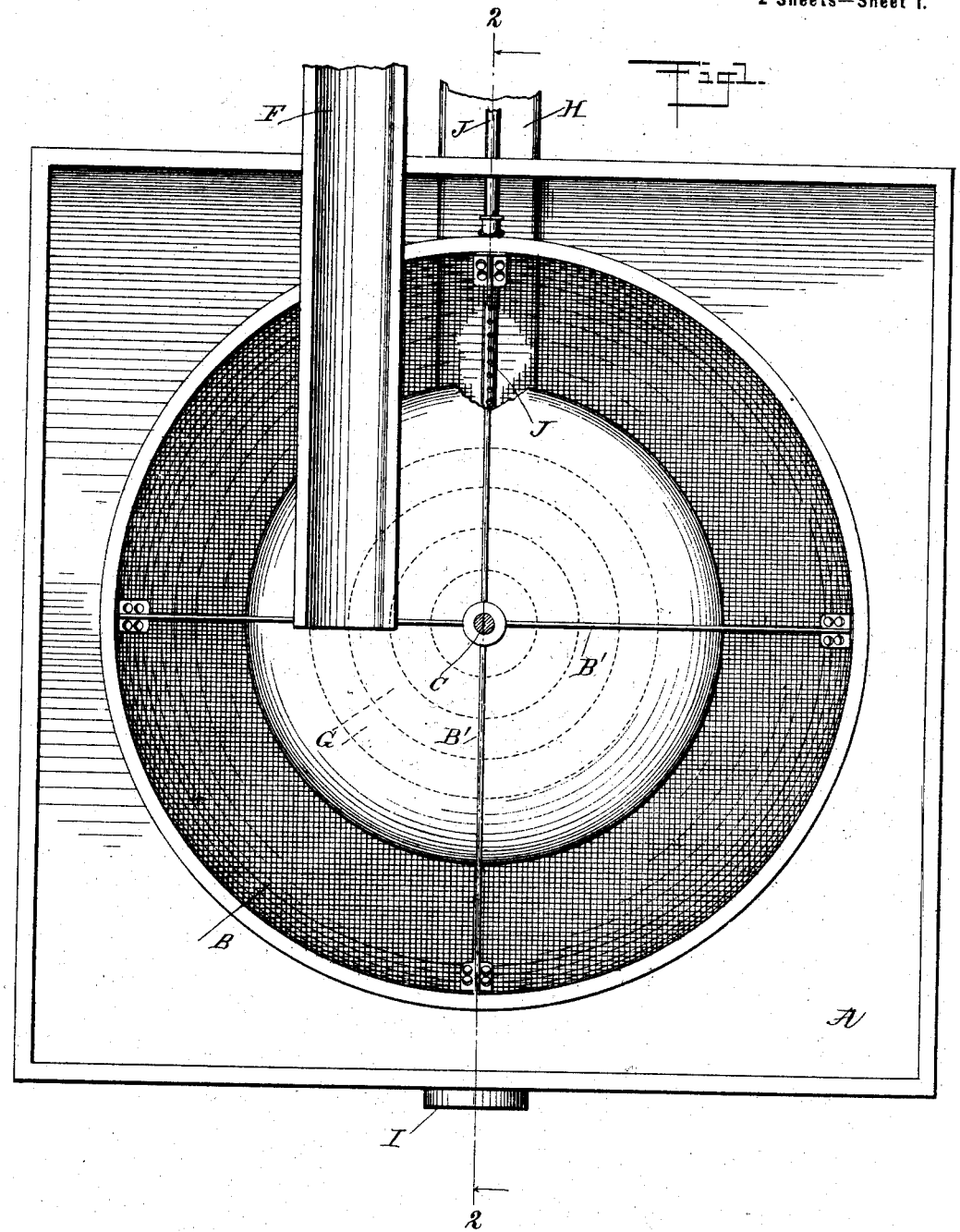
WITNESSES:
INVENTOR
Jeremiah K. McLaughlin
BY
ATTORNEYS

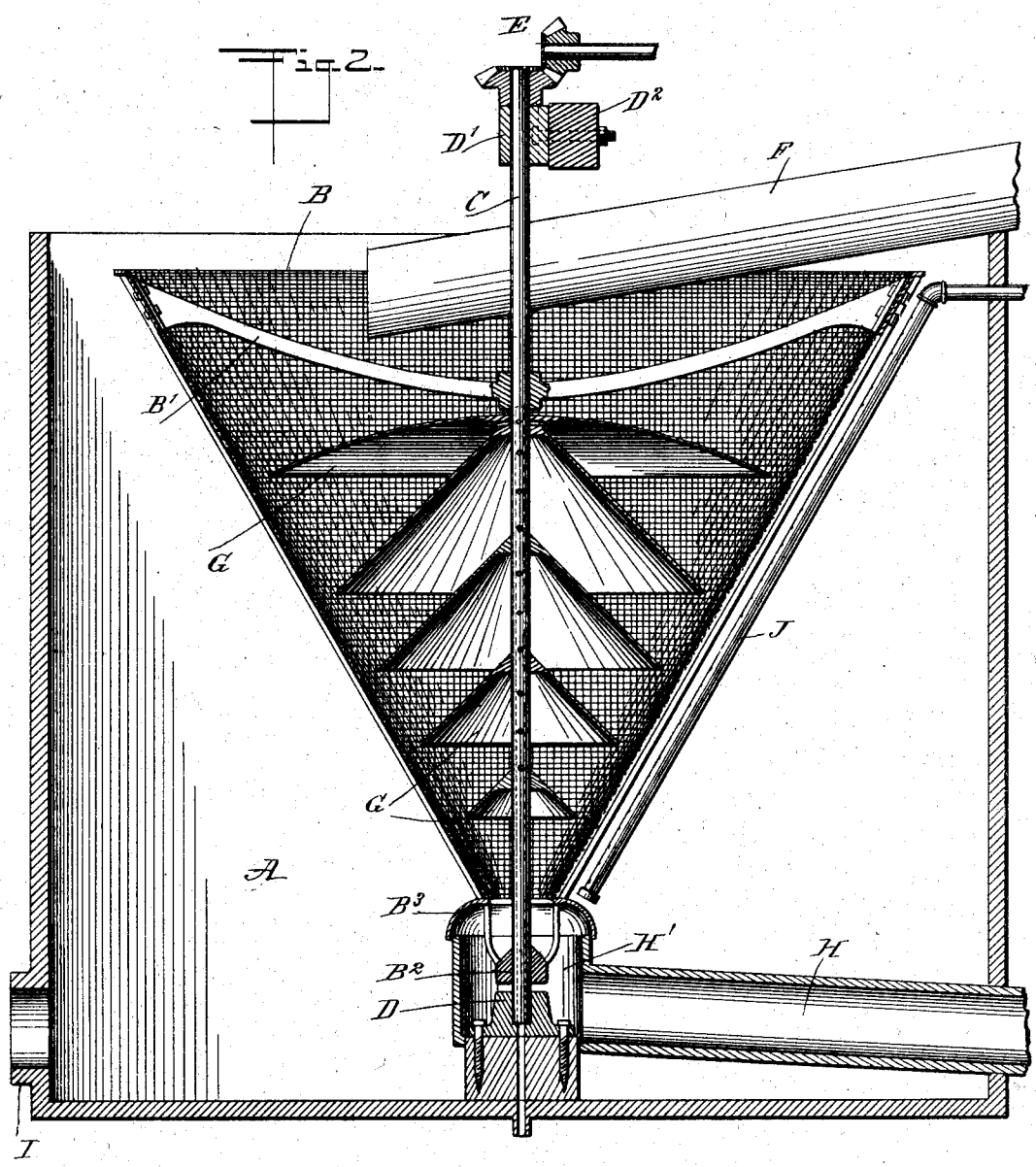

UNITED STATES PATENT OFFICE.

JEREMIAH K. McLAUGHLIN, OF AUSABLE FORKS, NEW YORK.

PULP-SEPARATOR.

SPECIFICATION forming part of Letters Patent No. 706,441, dated August 5, 1902.

Application filed October 4, 1901. Serial No. 77,564. (No model.)

*To all whom it may concern:*

Be it known that I, JEREMIAH K. MCLAUGHLIN, a citizen of the United States, and a resident of Ausable Forks, in the county of Essex and State of New York, have invented a new and Improved Separator for Pulp-Mills, of which the following is a full, clear, and exact description.

The invention relates to the manufacture of wood-pulp by the sulfid process; and its object is to provide a new and improved separator for pulp-mills which is simple and durable in construction, very effective in operation, and arranged to insure a quick and thorough separation of the stock from the acid.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in both the views.

Figure 1 is a plan view of the improvement with part broken out, and Fig. 2 is a sectional side elevation of the same on the line 2 2 of Fig. 1.

In a suitably-constructed tank or vat A is mounted to rotate a screen B, preferably funnel-shaped and secured by spiders B' B² to a vertical shaft C, journaled at its lower end in a step D and near its upper end in a bearing D', secured to a bridge-tree D², as indicated in Fig. 2. The upper end of the shaft C is connected by a gearing E or other means with suitable machinery for imparting a rotary motion to the shaft C to revolve the screen B within the tank A at a desired rate of speed. The pulp to be treated passes from the digester and the chute F into the upper end of the screen B, the meshes of which are sufficiently fine to prevent the stock from passing through, but which will allow the acid to pass through the meshes into the tank A. The pulp in its downward movement in the screen B is agitated by deflecting-disks G, of which the upper one is spherical, while the remaining ones are preferably in the shape of inverted hollow cones, as plainly indicated in Fig. 2. The base edges of the said deflectors G extend within a short distance of the inner surface of the screen B, and the deflectors are secured to the shaft C, so as to rotate with the same and the screen B to cause the deflectors to throw the stock and acid outward against the screen to insure a proper separation of the stock from the acid, the latter passing through the meshes into the tank A, while the stock passes downward through the apex end of the screen into the circular head H' of the discharge-pipe H, leading to the outside of the tank A, to carry off the stock after the same is separated from the acid. The acid which accumulates in the tank A passes from the latter through an outlet I to a suitable receptacle. In order to prevent the screen B from being blocked up by the stock, I provide a washing device, located exteriorly of the screen, preferably in the shape of a pipe J, connected with a suitable source of water-supply and having perforations adjacent to the peripheral surface of the screen B, so that the water passes in fine jets through the said perforations onto the screen to force the stock that collects on the inside of the screen back to the interior thereof, so as to keep the meshes clean for the free escape of the acid. In order to prevent the acid from passing into the head H', I provide the lower spider B² with a circular cap B³, extending over the head H', as clearly indicated in Fig. 2.

It is understood that by having the deflectors G arranged as described the acid is at all times directed downwardly and outwardly to the sides of the screen, so that a thorough separation of the stock from the acid takes place.

The shaft C is made hollow and connected with a suitable water-supply, and the wall of the shaft is perforated from the top of the second disk, so that the water in the pipe passes onto the disks and washes the acid from the stock as it passes down the screen.

Having thus described my invention, I claim as new and desire to secure by Letters Patent—

1. In a separator of the class described, the combination of a vertical shaft, a funnel-shaped screen revoluble with said shaft, and successively smaller deflectors carried by said shaft within said screen and having working surfaces inclined oppositely to the taper of said screen.

2. In a separator of the class described, the combination of a vertical shaft having jet-openings, a screen, and hollow conical deflectors carried by the shaft and having their inner surfaces opposite to said jet-openings, said conical deflectors having their active surfaces inclined to the active surface of said screen.

3. In a separator of the class described, the combination of a vertical shaft having jet-openings, a revoluble screen, means for feeding pulp to the upper end of the screen, and a series of conical deflectors mounted on the shaft and disposed in the path of the pulp discharged by the feed mechanism, said deflectors adapted to be flushed by jets from the shaft-openings.

4. A separator of the class described, comprising a tank having an acid-outlet, a funnel-shaped screen mounted to rotate on a vertical axis, an outlet communicating with the apex end of said screen, and a plurality of conical deflectors arranged within said screen and having their active surfaces inclined in opposite directions to the taper of the screen.

5. A separator of the class described, comprising a tank having an acid-outlet, a funnel-shaped screen mounted within said tank and adapted to rotate on a vertical axis, a pulp-outlet connected with the apex end of the screen, means for feeding pulp to the upper end of said screen, and deflectors mounted within and revoluble with said screen, said deflectors having their active surfaces inclined in opposite directions to the taper of the screen.

6. A separator of the class described, comprising a tank having an acid-outlet, a funnel-shaped screen mounted to rotate on a vertical axis and within said tank, a pipe provided with a head which communicates with the apex end of said screen, a cap fitted to the apex end of the screen and extending over the open end of said head, and a series of conical deflectors mounted within said screen and having their active surfaces inclined in an opposite direction to the taper of the screen.

7. A separator of the class described, comprising a tank, a vertical hollow shaft provided with jet-openings, a funnel-shaped screen revoluble on a vertical axis, and conical deflectors carried by said shaft and disposed adjacent to said jet-openings, said deflectors having their active surfaces inclined inwardly from the surface of the screen.

8. A separator of the class described, comprising a perforated vertical shaft, a funnel-shaped screen mounted on said shaft, and conical deflectors mounted within the screen and disposed in the path of the jets from said perforated shaft, said deflectors having their active surfaces inclined in opposite directions to the taper of the screen.

9. A separator of the class described, comprising a tank, a funnel-shaped screen mounted to rotate on a vertical axis and within said tank, means for feeding pulp into the upper end of the screen, means for collecting pulp at the foot of the screen, a series of conical deflectors disposed within the screen and having their active surfaces inclined in opposite directions to the taper of the screen, and an inclined perforated pipe disposed outside of the screen and adjacent to the surface thereof, as and for the purposes described.

In testimony whereof I have signed my name to this specification in the presence of two witnesses.

JEREMIAH K. McLAUGHLIN.

Witnesses:
WILLIAM CADIGAN,
HENRY W. CARTER.